United States Patent
Li et al.

(10) Patent No.: US 10,795,729 B2
(45) Date of Patent: Oct. 6, 2020

(54) DATA ACCELERATED PROCESSING SYSTEM

(71) Applicant: Cambricon Technologies Corporation Limited, Beijing (CN)

(72) Inventors: Kun Li, Beijing (CN); Dejing Wang, Beijing (CN); Shuo Xing, Beijing (CN)

(73) Assignee: Cambricon Technologies Corporation Limited, Beijing (CN)

( * ) Notice: Subject to any disclaimer, the term of this patent is extended or adjusted under 35 U.S.C. 154(b) by 11 days.

(21) Appl. No.: 16/374,126

(22) Filed: Apr. 3, 2019

(65) Prior Publication Data
US 2019/0332438 A1 Oct. 31, 2019

(30) Foreign Application Priority Data

Apr. 28, 2018 (CN) .................. 2018 1 04039263
Apr. 28, 2018 (CN) .................. 2019 1 01761252

(51) Int. Cl.
| | |
|---|---|
| *G06F 9/46* | (2006.01) |
| *G06F 9/50* | (2006.01) |
| *G06F 1/20* | (2006.01) |
| *G06F 1/3296* | (2019.01) |
| *G06F 9/38* | (2018.01) |
| *G06F 11/30* | (2006.01) |

(52) U.S. Cl.
CPC ............ *G06F 9/5027* (2013.01); *G06F 1/206* (2013.01); *G06F 1/3296* (2013.01); *G06F 9/38* (2013.01); *G06F 11/3062* (2013.01)

(58) Field of Classification Search
CPC .................................................. G06F 9/45533

USPC .............................................................. 718/1
See application file for complete search history.

(56) References Cited

U.S. PATENT DOCUMENTS

| | | | | |
|---|---|---|---|---|
| 6,817,013 B2* | 11/2004 | Tabata | ..................... | G06F 8/443 712/233 |
| 7,149,879 B2* | 12/2006 | Liang | ................... | G06F 9/30149 712/210 |
| 8,020,025 B2* | 9/2011 | Hyatt | .................... | G06F 1/3203 713/320 |

(Continued)

OTHER PUBLICATIONS

EP19169140.1, European Search Report dated Sep. 18, 2019, 7 pages.

*Primary Examiner* — Mehran Kamran
(74) *Attorney, Agent, or Firm* — Getech Law LLC; Jun Ye (57) ABSTRACT

Disclosed is a data accelerated processing system including a processing device, a storage device, an interface device and a control device. The processing device is configured to realize accelerated operation processing of data. The storage device is electrically connected to the processing device for storing the data sent by a server. The interface device is electrically connected to the processing device for data transmission between the processing device and the server. The control device is configured to regulate the status of the processing device. During an operation process, a large number of operating tasks in the server may be transmitted to the processing device for operating through the interface device, and large amounts of buffered data may be stored in the storage device. The data accelerated processing system improves data reading speed and operation efficiency through the cooperation of the processing device, the storage device and the interface device.

16 Claims, 7 Drawing Sheets

(56) References Cited

U.S. PATENT DOCUMENTS

| | | | | |
|---|---|---|---|---|
| 2008/0127044 A1* | 5/2008 | Barros | G06Q 10/06 | 717/104 |
| 2008/0235690 A1* | 9/2008 | Ang | G06F 9/526 | 718/102 |
| 2009/0014433 A1* | 1/2009 | O'Neil | G06F 1/206 | 219/491 |
| 2009/0177864 A1* | 7/2009 | Moreton | G06F 9/5061 | 712/30 |
| 2009/0228886 A1* | 9/2009 | Kowalkiewicz | G06Q 10/06 | 718/100 |
| 2009/0307519 A1* | 12/2009 | Hyatt | G06F 1/3203 | 713/502 |
| 2013/0036425 A1* | 2/2013 | Zimmermann | G06F 9/4881 | 718/106 |
| 2014/0115429 A1* | 4/2014 | Eroz | H04L 1/00 | 714/790 |
| 2014/0201558 A1* | 7/2014 | Darrington | G06F 11/3058 | 713/340 |
| 2014/0351827 A1* | 11/2014 | Llamas | G06F 9/4881 | 718/107 |
| 2016/0011901 A1* | 1/2016 | Hurwitz | G06F 9/4843 | 718/101 |
| 2017/0031431 A1* | 2/2017 | Khatri | G06F 1/266 | |
| 2018/0183577 A1* | 6/2018 | Suresh | H04L 9/0643 | |
| 2018/0322383 A1* | 11/2018 | Feng | G06N 3/04 | |
| 2018/0322385 A1* | 11/2018 | Yehezkel Rohekar | G06N 3/08 | |
| 2019/0079795 A1* | 3/2019 | Feehrer | G06F 9/4881 | |
| 2019/0114499 A1* | 4/2019 | Delaye | G06F 17/153 | |
| 2019/0114534 A1* | 4/2019 | Teng | G06N 3/0454 | |
| 2019/0114535 A1* | 4/2019 | Ng | G06N 3/063 | |
| 2019/0114538 A1* | 4/2019 | Ng | G06N 3/063 | |
| 2019/0190538 A1* | 6/2019 | Park | H03M 7/70 | |
| 2019/0196746 A1* | 6/2019 | Fujimoto | G06F 3/06 | |

* cited by examiner

DATA ACCELERATED PROCESSING SYSTEM

TECHNICAL FIELD

The present disclosure relates to the field of data operation technology, and in particular, relates to a data accelerated processing system.

BACKGROUND

With the rapid advancement of science and technology, information technology is developing by orders of magnitude in many fields such as data acquisition, data storage and data processing. During the process, other technologies such as big data, cloud computing and machine learning are emerging and developing, which have been applied widely in areas including scientific computing, image processing, speech recognition, classification and prediction, as well as data mining. However, in practical applications, HPC (High Performance Computing) posts challenges for the basic compute capability of both local and cloud computing platforms. In order to solve the problem of insufficient compute capability of an existing computing platform, a hardware accelerator card is often implemented to process large-scale data workloads faster, which has gradually become a trend.

Traditional hardware accelerator cards include an accelerator card with GPU (Graphics Processing Unit) as its core, an accelerator card with a many-core processor as its core, and an accelerator card with FPGA (Field-Programmable Gate Array) as its core. Traditional hardware accelerator cards have the problems of high thermal energy consumption, low operation efficiency and lack of flexibility in application.

SUMMARY

Based on this situation, it is necessary to provide a data accelerated processing system to overcome the problems of high thermal energy consumption, low operation efficiency and lack of flexibility in traditional accelerator cards.

A data accelerated processing system includes:

a processing device, configured to realize accelerated operation processing of data, the processing device includes at least one processor;

a storage device, including a plurality of storage units, each of the storage units being electrically connected to the processing device for storing data;

an interface device, electrically connected to the processing device, for transmitting data; and a control device, electrically connected to the processing device, for regulating the status of the processing device.

In one embodiment, the processor has a bit width of (N+M) bits, N representing a data bit, M representing a parity bit, wherein, $N=2^n$, n is an integer greater than or equal to 0, M represents a positive integer.

In one embodiment, $M=n+2$, n being greater than or equal to 3, M being greater than or equal to 5.

In one embodiment, the processing device includes two processors;

each of the processors is electrically connected to at least one of the storage units;

the interface device includes a PCIE interface and a PCIE interface expansion chip electrically connected to the PCIE interface, the PCIE interface expansion chip being electrically connected to the processor.

In one embodiment, each of the storage units includes a plurality of Double Data Rate Synchronous Dynamic Random Access Memories.

In one embodiment, the data accelerated processing system further includes:

a power supply device, electrically connected to the processing device, the interface device, and the control device respectively.

In one embodiment, the data accelerated processing system further includes:

a current monitoring device, electrically connected to the power supply device and the control device respectively, configured to monitor the output of the power supply device to ensure the electric current for the normal functioning of the data accelerated processing system.

In one embodiment, the data accelerated processing system further includes:

a temperature monitoring device, electrically connected to the control device, configured to monitor the temperature status of the processing device.

In one embodiment, the data accelerated processing system further includes:

a reset device, electrically connected to the processing device, configured to reset the processing device In one embodiment, the data accelerated processing system further includes:

a clock control device, electrically connected to the processing device, configured to control the clock of the processing device.

In one embodiment, the processor is configured to execute computations of n pipeline stages, wherein n is greater than or equals to 2;

the processor is specifically configured to execute computations of a first pipeline stage on data to obtain a first result, the first result is input to a second pipeline stage to be executed in computations of the second pipeline stage to obtain a second result, and similarly, a $n-1^{th}$ result is input to a $n^{th}$ pipeline stage to be executed in computations of the $n^{th}$ pipeline stage, a $n^{th}$ result is obtained and input to the storage unit, wherein, n is an integer greater than or equal to 2.

In one embodiment, the processor includes: a primary processing circuit and a plurality of secondary processing circuits;

the primary processing circuit is configured to execute operations on input data, and transmit data and operation instructions between the plurality of secondary processing circuits;

the plurality of secondary processing circuits are configured to execute intermediate operations in parallel based on the data and the operation instructions received from the primary processing circuit to obtain a plurality of intermediate results, and transmit the plurality of intermediate results to the primary processing circuit;

the primary processing circuit is further configured to execute following data operations on the plurality of intermediate results to obtain the operation result of the operation instructions.

In one embodiment, the processor includes: a tree-structure module, the tree-structure module including a root port and a plurality of branch ports, where the root port of the tree-structure module is connected to the primary processing circuit, and the plurality of branch ports of the tree-structure module are connected to one of the plurality of secondary processing circuits respectively;

the tree-structure module is configured to forward data blocks, weights, and operation instructions between the primary processing circuit and the plurality of secondary processing circuits.

In one embodiment, the processor includes: a primary processing circuit, one or more branch processing circuits and a plurality of secondary processing circuits; wherein, the primary processing circuit is configured to divide one input data into a plurality of data blocks, the input data includes input neuron data and weight data; the primary processing circuit is specifically configured to determine the input neuron data as broadcast data and the weight data as distribution data, then divide one distribution data into a plurality of data blocks, and send at least one of the data blocks, the broadcast data, and at least one of a plurality of operation instructions to the one or more branch processing circuits;

the one or more branch processing circuits are configured to forward data blocks, broadcast data and operation instructions between the primary processing circuit and the plurality of secondary processing circuits;

the plurality of secondary processing circuits are configured to process the received data blocks and broadcast data according to the operation instructions to obtain intermediate results, then transmit the intermediate results to the one or more branch processing circuits;

the primary processing circuit is configured to process the intermediate results sent from the one or more branch processing circuits to obtain the result of the operation instructions, and send the result of the operation instructions to the processor.

In one embodiment, the processor includes: a primary processing circuit and a plurality of secondary processing circuits;

the plurality of secondary processing circuits are arranged in the form of an array; each secondary processing circuit is electrically connected to other adjacent secondary processing circuits, and the primary processing circuit is electrically connected to k secondary processing circuits of the plurality of secondary processing circuits, the k secondary processing circuits being: n secondary processing circuits in a first row, n secondary processing circuits in a $m^{th}$ row, and m secondary processing circuits in a first column;

the primary processing circuit is configured to divide one input data into a plurality of data blocks, and send at least one of the data blocks and at least one of a plurality of operation instructions to the k secondary processing circuits;

the k secondary processing circuits are configured to forward data and instructions between the primary processing circuit and the plurality of secondary processing circuits;

the plurality of secondary processing circuit are configured to execute operations on the received data blocks according to the operation instructions to obtain intermediate results, and transmit the operation results to the k secondary processing circuits;

the primary processing circuit is configured to process the intermediate results sent from the k secondary processing circuits to obtain the result of the operation instructions, and send the result of the operation instructions to the processor.

The disclosure provides a data accelerated processing system, including a processing device, a storage device, an interface device and a control device. The processing device is configured to realize accelerated operation processing of data. The processing device includes at least one processor. The storage device is electrically connected to the processing device for storing data sent by a server. The interface device is electrically connected to the processing device for data transmission. The control device is electrically connected to the processing device to regulate the status of the processing device. During an operation process, a large number of operating tasks in a server may be transmitted to the processing device for operating through the interface device. During the operation process, large amounts of buffered data may be stored in the storage device. The data accelerated processing system improves data reading speed and operation efficiency through the cooperation of the processing device, the storage device and the interface device. The processing device employs different types of dedicated processors to greatly reduce the thermal energy consumption of the data accelerated processing system. The control device regulates the operating status of the processor in real time. The server is capable of adjusting the tasks assigned to the processor in real time according to the operating status of the processor.

Reference numerals used in the drawings:
Data accelerated processing system 10;
Processing device 100;
   Processor 110;
      Primary processing circuit 102;
      Branch processing circuit 103;
      Secondary processing circuit 104;
      Tree-structure module 40;
Storage device 200;
   Storage unit 210;
Interface device 300;
   PCIE interface 310;
   PCIE interface expansion chip 320;
Control device 400;
Power supply device 500;
Reset device 600;
Current monitoring device 700;
Temperature monitoring device 800;
Clock control device 900;
Server 20.

DETAILED DESCRIPTION OF THE EMBODIMENTS

In order to make the purpose, technical solutions, and advantages of the disclosure clearer, a data accelerated processing system provided in the present disclosure will be further described below in combination with reference to the drawings and with specific embodiments in detail. It should be understood that the specific embodiments described herein are merely used for explaining, rather than limiting, the present disclosure.

Figure 1:
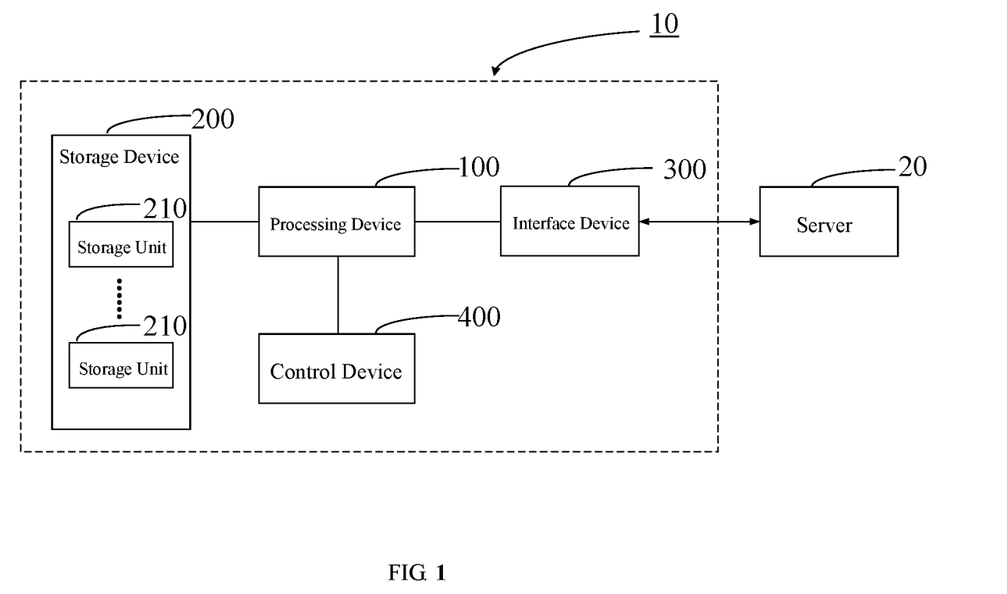
FIG. 1 is an internal structure diagram of the data accelerated processing system in one embodiment of the present disclosure.

Referring to FIG. 1, a data accelerated processing system 10 is provided in one embodiment, including a processing device 100, a storage device 200, an interface device 300 and a control device 400.

Figure 2:
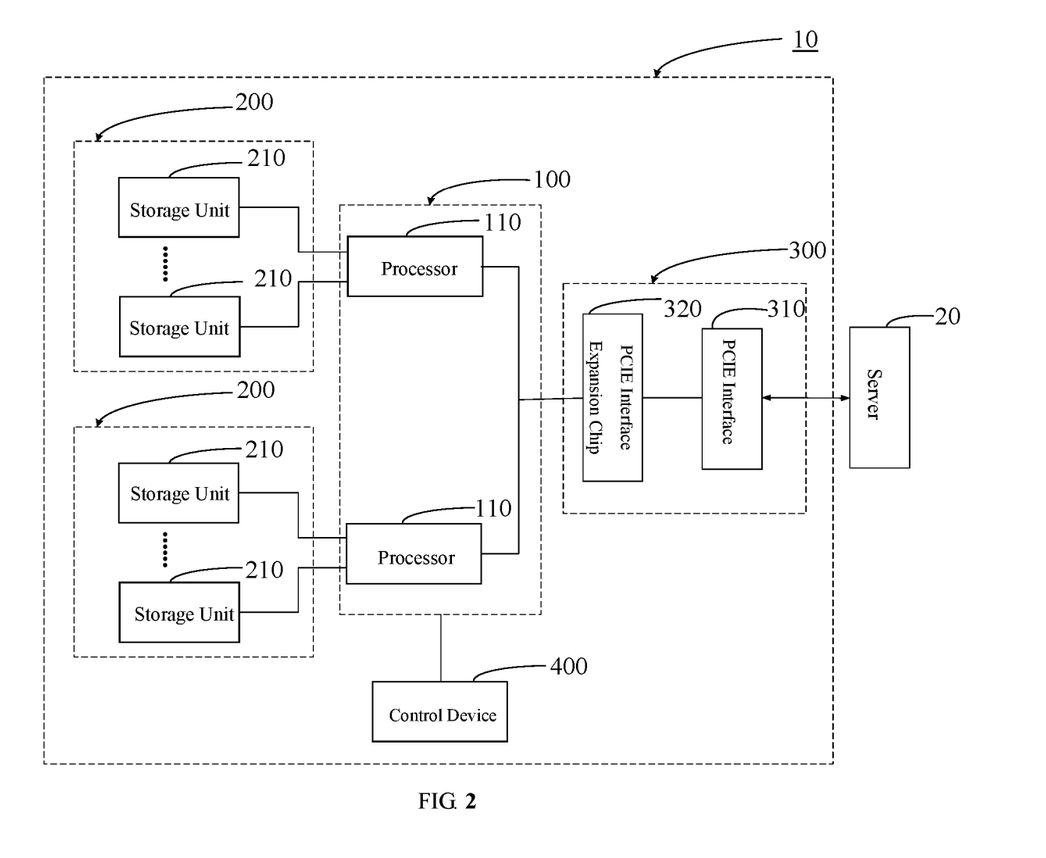
FIG. 2 is an internal structure diagram of the data accelerated processing system in one embodiment of the present disclosure.

The processing device 100 is configured to realize accelerated operation processing of data. The processing device 100 may be configured according to specific operation demands. When the data accelerated processing system 10 is configured to process an operation of deep learning, the processing device 100 is capable of improving the processing speed and energy efficiency of deep leaning, and is also capable of connecting to a server to perform accelerated operation on large amounts of data in the server. Referring to FIG. 2, the processing device 100 includes at least one processor 110. The processor 110 may be an ASIC (Application Specific Integrated Circuit). The processor 110 may be designed according to a computing demand. A different processor 110 may have different bits for data processing or may have different operation functions. The processing device 100 may employ a different type of the processor 110 to process data. The data accelerated processing system 10 may include a plurality of different types of the processing devices 100. Different types of data operations may be realized by employing different types of the processing devices 100, thus, the thermal energy consumption of the data accelerated processing system 10 may be greatly reduced. Similarly, by employing the processor 110 that has low power consumption and high specialization in the data accelerated processing system 10, the operation efficiency, software configurability and flexibility in application of the data accelerated processing system 10 are greatly improved.

In one embodiment, the bit width of the processor 110 may only include a data bit. For example, the bit width of the processor 110 may include data bits of 8 bits, 128 bits, or 512 data bits. In another embodiment, the processor 110 may have a bit width of (N+M) bits, where N represents a data bit, $N=2^n$, $n=0, 1, 2, 3, 4, 5 \ldots$, M represents a parity bit and is a positive integer, i.e., $M \geq 1$. Specifically, for every doubling of the data bit N, the parity bit M is increased by one bit, i.e., $M=n+2$. Further, the value ranges of M and n may be: n being greater than or equal to 3, M being greater than or equal to 5. For example, the bit width of the processor 110 may be configured as 8 data bits and 5 ECC parity bits. The bit width of the processor 110 may be configured as 16 data bits and 6 ECC parity bits. Further, the data bit N of the processor 110 may be greater than or equal to 32 bits, i.e., n is greater than or equal to 5. Correspondingly, the parity bit M may be greater than or equal to 7, that is, for every doubling of the data bit N, the parity bit M is increased by one bit. For example, the bit width of the processor 110 may further be configured as 32 data bits and 7 ECC parity bits. The bit width of the processor 110 may further be configured as 64 data bits and 8 ECC parity bits. The bit width of the processor 110 may further be configured as 128 data bits and 9 ECC parity bits. The bit width of the processor 110 may further be configured as 256 data bits and 10 ECC parity bits. Similar situations will not be further described here. When designing the data bit and the parity bit, the rule that for every doubling of the data bit, the parity bit is increased by one bit may be followed. It should be noted that ECC has the function of detecting and correcting errors. Generally, ECC is often applied in a data processing control terminal that performs high-speed operations to ensure that the whole data processing control system works more safely and steadily.

The storage device 200 and the processing device 100 are electrically connected, alternatively, the storage device 200 and the processing device 100 are connected through a bus, and the storage device 200 is configured to store data. The storage device 200 may include a plurality of storage units 210. Each of the storage units 210 is connected to the processor 110 through the bus. It can be understood that each of the storage units 210 may be DDR SDRAM. DDR SDRAM is the abbreviation of Double Data Rate Synchronous Dynamic Random Access Memory, which will be referred to as DDR hereinafter.

As mentioned above, DDR transfers data two times per clock cycle, specifically, DDR is capable of transferring data once at the rising edge of the clock and once at the falling edge of the clock, therefore DDR is capable of achieving higher data transfer rate than SDRAM with a same bus frequency. Specifically, the speed of DDR may be twice as fast as standard SDRAM. Furthermore, DDR employs an advanced synchronous circuit to allow the major steps of the transmission and output of designated addresses and data to be performed independently as well as being in complete synchronization with CPU. DDR employs a delay-locked loop to provide a data filtering signal. When data is valid, the processing device 100 can accurately locate the data according to the data filtering signal, then outputting the data every sixteen times and resynchronizing data from different storage devices.

In one embodiment, the storage device 200 may include four of the storage units 210. Each of the storage units 210 includes a plurality of DDRs. Specifically, each of the storage units 210 may include a plurality of DDR4 particles (chips). Alternatively, the type of the DDR4 may be DDR4-3200. Specifically, the theoretical bandwidth of a single storage unit (single channel/single DDR) is 25600 MB/s=25.6 GB/s. It can be understood that, when DDR4-3200 particles are employed in each of the storage units 210, the theoretical bandwidth of data transmission may reach 102.4 GB/s. In one embodiment, four DDR controllers are configured in the processor 110. Each DDR controller is capable of controlling one group of DDR. The processor 110 may include four 72-bit DDR4 controllers, 64 bits are for data transmission and 8 bits are for ECC parity. A DDR controller is configured in the processor 110 for performing control on the data transmission and data storage of each of the storage units 210.

The interface device 300 is electrically connected to the processing device 100. The interface device 300 is configured to transmit the data between the processing device 100 and a server. For example, the interface device 300 may be a standard PCIE interface, and data to be processed is transmitted to the processing device 100 from the server through a standard PCIE interface, thus, data transmission is realized. Alternatively, the interface device 300 may be a PCIE 3.0 X 16 interface, when a PCIE 3.0 X 16 interface is employed for data transmission, the theoretical bandwidth may reach 16000 MB/s. In another embodiment, the interface device 300 may be another interface as long as the interface device 300 is capable of realizing the function of transmission. In addition, the computing results of the processing device 100 are transmitted back to the server by the interface device 300.

The control device 400 is electrically connected to the processing device 100. The control device 400 is configured to regulate the status of the processing device 100. Specifically, the processing device 100 and the control device 400 may be electrically connected through SPI interfaces. The control device 400 may include a MCU (Micro Controller Unit). The processing device 100 may include a plurality of processing chips or a plurality of processing cores, and is capable of driving a plurality of loads. Therefore, the processing device 100 may be in different work status such as multi-load and light-load. The work status of the processing device 100 may be adjusted through the control device 400.

The data accelerated processing system 10 provided in the embodiment includes a processing device 100, a storage device 200, an interface device 300 and a control device 400. The processing device 100 is configured to realize accelerated operation processing of data. The storage device 200 is connected to the processing device 100 through a bus for storing the data sent by a server. The interface device 300 is electrically connected to the processing device 100, for transmitting the data between the processing device 100 and the server. During an operation process, a large number of operating tasks in the server may be transmitted to the processing device 100 to be operated through the interface device 300. During the operation process, large amounts of buffered data may be stored in the storage device 200. The control device 400 is electrically connected to the processing device 100, the control device 400 is configured to monitor the status of the processing device 100. The data accelerated processing system 10 improves data reading speed and operation efficiency through the cooperation of the processing device 100, the storage device 200, the interface device 300 and the control device 400.

Referring to FIG. 2, in one embodiment, the processing device 100 includes two processors 110. In the present embodiment, the processors 110 may be different types of chips. It can be understood that the processors 110 may differ in bit width, the type of data to be processed and data processing speed.

As shown in FIG. 2, the processing device 100 may include two processors 110. Each processor 110 is connected to a plurality of the storage units 210 through a bus. When the storage unit 210 is the above-mentioned DDR, the processors 110 may further include a DDR controller configured to control the storage unit 210.

Alternatively, the interface device 300 includes a PCIE interface 310 and at least one PCIE interface expansion chip 320. The input terminal of the PCIE interface 310 is electrically connected to the server. The output terminal of the PCIE interface 310 is electrically connected to the input terminal of the PCIE interface expansion chip 320. The output terminal of the PCIE interface expansion chip 320 is electrically connected to the processors 110. It can be understood that the PCIE interface 310 realizes the data transmission between the server and the processing device 100. The PCIE interface expansion chip 320 expands the number of the processors 110 in the data accelerated processing system 10.

In the present embodiment, the function of the data accelerated processing system 10 is further expanded by arranging the PCIE interface 310 and the PCIE interface expansion chip 320 to enable the data accelerated processing system 10 to be electrically connect to more processors 110. Each processor 110 may be electrically connected to a plurality of the storage units 210 to allow the data accelerated processing system 10 to take more operational data.

Figure 3:
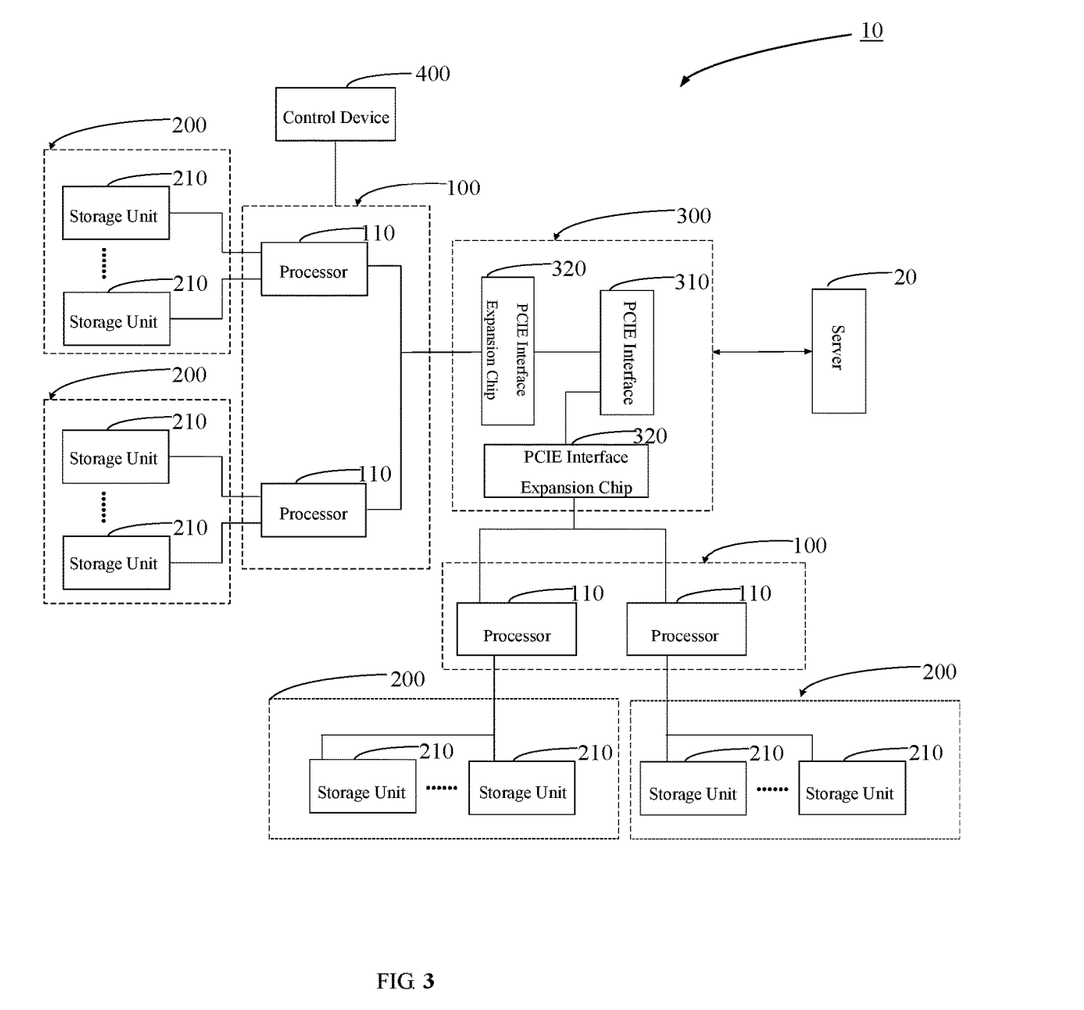
FIG. 3 is an internal structure diagram of the data accelerated processing system in one embodiment of the present disclosure.

Referring to FIG. 3, the data accelerated processing system 10 includes one PCIE interface 310 and one or more expansion modules. For example, the one or more expansion modules may include two PCIE interface expansion chips 320. Each PCIE interface expansion chip 320 may be connected to two processors 110. Each processor 110 may further be connected to a plurality of storage units 210. Thus, the data operation function of the data accelerated processing system 10 is further expanded. In another embodiment, the data accelerated processing system 10 may further include more of the PCIE interfaces 310 and more of the PCIE interface expansion chips 320. For example, each interface device 300 may be connected to three or more processors so that the data operation function of the data accelerated processing system 10 can be further expanded. The operation of the data accelerated processing system 10 may be realized by the electrical connection of the processors 110. In the present embodiment, the specific structure of the data accelerated processing system 10 may be configured differently according to the function fulfilled by the data accelerated processing system 10 in a specific server.

Figure 4:
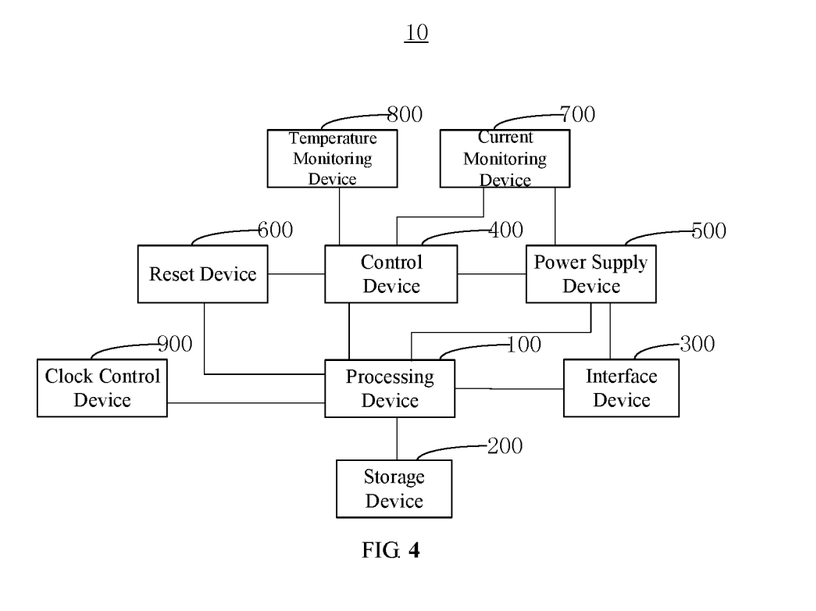
FIG. 4 is an internal structure diagram of the data accelerated processing system in one embodiment of the present disclosure.

Referring to FIG. 4, a data accelerated processing system 10 provided in one embodiment further includes a power supply device 500. The power supply device 500 is electrically connected to the processing device 100, the interface device 300 and the control device 400 respectively. Alternatively, the power supply device 500 is connected to the processing device 100 through a bus (e.g. IIC bus, IIC is the abbreviation of Inter-Integrated Circuit).

The power supply device 500 is controlled by the control device 400. The power supply device 500 is capable of converting the power supply voltages of the PCIE interface 310 and an external interface to suitable voltages for the components of the data accelerated processing system 10, and providing a steady current path for the data accelerated processing system 10. In addition, the control device 400 is capable of performing dynamic voltage scaling and frequency modulation on the processing device 100. The control device 400 may be electrically connected to the processing device 100. For example, the control device 400 can communicate with the processing device 100 through a SPI bus to obtain the work status of the processing device 100 in real time, and then adjust the output voltage of the power supply device 500 through the bus (e.g., IIC bus) according to different work status, thus dynamic voltage scaling and frequency modulation are realized.

In one embodiment, the data accelerated processing system 10 further includes a current monitoring device 700. The current monitoring device 700 is electrically connected to the power supply device 500 and the control device 400 respectively. The current monitoring device 700 is configured to control the power supply device 500 to ensure that the power supply device 500 outputs the current for the normal functioning of the data accelerated processing system 10. The current monitoring device 700 is capable of monitoring the output voltage and output current of the power supply device 500. The control device 400 can monitor the output current of the power supply device 500 through the current monitoring device 700, so that the control device 400 can control the power supply device 500 to supply power to the processor 110. Alternatively, the current monitoring device 700 is connected to the control device 400 through a bus. For example, the control device 400 detects the data in the current monitoring device 700 through an IIC bus. When the current recorded in the current monitoring device 700 exceeds a preset value, the power supply device 500 is shut down to realize overcurrent protection. Alternatively, when the control device 400 detects that the input current of the current monitoring device 700 (the input current of the current monitoring device 700 is the output current of the power supply device 500) is not within a preset current range, the control device 400 reminds that the electricity supplied by the power supply device 500 is unsteady. The preset current range is not limited and is subject to the structure and the usage specification or the usage protocol of the data accelerated processing system 10.

In one embodiment, the data accelerated processing system 10 further includes a temperature monitoring device 800. The temperature monitoring device 800 is electrically connected to the control device 400, alternatively, the temperature monitoring device 800 is connected to the control device 400 through a bus, for monitoring the temperature status of the processing device 100 and the temperature status of the whole data accelerated processing system 10. Alternatively, the temperature monitoring device 800 may be a temperature sensor. The temperature monitoring device 800 may be arranged at a position near the processor 110. The control device 400 detects return values of a temperature sensor through an IIC bus. When the temperature returned by the temperature sensor exceeds a preset value, the power supply device 500 is shut down to realize overheating protection. Specifically, the control device 400 can read the temperature value of the processors 110 directly. Further, the control device 400 determines whether the temperature of the processors 110 is normal by reading the temperature value stored in the register of each of the processors 110.

In the present embodiment, the data accelerated processing system 10 is further configured with the functions of overheating protection, overcurrent protection, dynamic voltage scaling and frequency modulation, so that the data accelerated processing system 10 is capable of dealing with abnormal operations, and can achieve the advantages of safety, reliability and the like.

In one embodiment, the data accelerated processing system 10 further includes a reset device 600. The reset device 600 is electrically connected to the processing device 100 and the control device 400 to reset the processing device 100. Specifically, the reset device 600 is capable of resetting the processors 110, or separately resetting the four groups of DDRs in one processor 110. The reset device 600 consists of an AND gate chip. When the PCIE interface 310 or the control device 400 sends a reset signal, the processing device 100 performs corresponding reset operations.

In one embodiment, the data accelerated processing system 10 further includes a clock control device 900. The clock control device 900 is electrically connected to the processing device 100 for realizing clock control on the processing device 100. The clock control device 900 may include a crystal oscillator and a clock buffer to provide an internal single-ended clock and an external differential clock respectively for the processing device 100. The electrical connection mentioned in the present disclosure may be one of the following: bus connection, general-purpose wire connection or specific-purpose electric wire connection.

FIG. 5 to FIG. 9 are diagrams of different structures of the processor 110. In one embodiment, the processing device 100 includes a plurality of processors 110. Each processor 110 is configured to execute computations of n pipeline stages, where n is greater than or equal to 2. Each processor 110 is configured to execute computations of a first pipeline stage on data to obtain a first result, the first result is input to a second pipeline stage to be executed in computations of the second pipeline stage to obtain a second result, and similarly, a $n-1^{th}$ result is input to a $n^{th}$ pipeline stage to be executed in computations of the $n^{th}$ pipeline stage, and a $n^{th}$ result is obtained and input to the storage unit 210, where n is an integer greater than or equal to 2.

Specifically, the operations performed by the processor 110 include neural network computations.

In one embodiment, the processor 110 can be configured to perform computations of two, three or four pipeline stages. Correspondingly, the processor 110 includes, but is not limited to: one or a plurality of multipliers in a first pipeline stage; one or a plurality of adders in a second pipeline stage (more specifically, adders in the stage may form an adder tree); and/or an activation function unit in a third pipeline stage; and/or a vector processing unit in a fourth pipeline stage (more specifically, the vector processing unit may process vector operations and/or pooling operations). The first pipeline stage multiplies input data 1 (in1) by input data 2 (in2) to obtain an output (out), the process is as follows: out=in1*in2. The second pipeline stage adds input data in1 through adders to obtain output data (out). More specifically, when the second pipeline stage is an adder tree, input data in1 is added step by step in the adder tree to obtain output data (out), in1 is a vector with a length of N, N is greater than 1, the process is as follows: out=in1[1]+in1[2]+ . . . +in1[N], and/or, input data (in1) is added in the adder tree and then the result thereof is added with input data (in2) to obtain output data (out), the process is as follows: out=in1[1]+in1[2]+ . . . −in1[N]+in2, or input data (in1) and input data (in2) are added together to obtain output data (out), the process is as follows: out=in1+in2.

The third pipeline stage performs operations on input data (in) through an activation function (active) to obtain activation output data (out), the process is as follows: out=active (in). The activation function active may be sigmoid, tan h, relu, softmax and the like. In addition to performing activation operations, the third pipeline stage is capable of performing other non-linear functions. The third pipeline stage is capable of processing input data (in) through an operation (f) to obtain output data (out), the process is as follows: out=f (in). The vector processing unit of the fourth stage performs pooling operations on input data (in) to obtain output data (out) after being pooled, the processing is as follows: out=pool (in), pool represents a pooling operation. The pooling operation includes, but is not limited to mean-pooling, max-pooling, median-pooling; as mentioned above, input data in is the data in a pooling kernel related to output data out.

The operations performed by the processor 110 include that the operations of the first pipeline stage, which is multiplying the input data 1 by the input data 2 to obtain data; and that the addition performed by the second pipeline stage (more specifically, adder tree operations, which is configured to add input data 1 step by step in the adder tree), or addition of the input data 1 and input data 2 to obtain output data; and/or that the activation function operations of the third pipeline stage, which is to obtain output data by performing activation function (active) operations on input data; and/or the pooling operations of the fourth pipeline stage of which the process is out=pool (in), pool represents a pooling operation that includes, but is not limited to mean-pooling, max-pooling, median-pooling, input data in is the data in a pooling kernel related to output data out. The operations of one or more of the pipeline stages among the above-mentioned pipeline stages may be performed with different orders to realize operations of different functions.

Alternatively, the processor 110 may include a primary processing circuit 102 and a plurality of secondary processing circuits 104.

The primary processing circuit 102 is configured to divide one input data into a plurality of data blocks, and send at least one of the data blocks as well as at least one operation instruction in a plurality of operation instructions to the secondary processing circuits 104.

The plurality of secondary processing circuits 104 are configured to execute operations on the data block received to obtain an intermediate result according to the operation instruction, and transmit the intermediate result to the primary processing circuit 102.

The primary processing circuit 102 is configured to process intermediate results sent by the plurality of secondary processing circuits 104 to obtain the result of the operation instruction, and transmit the result of the operation instruction to the processor 110.

Figure 5:
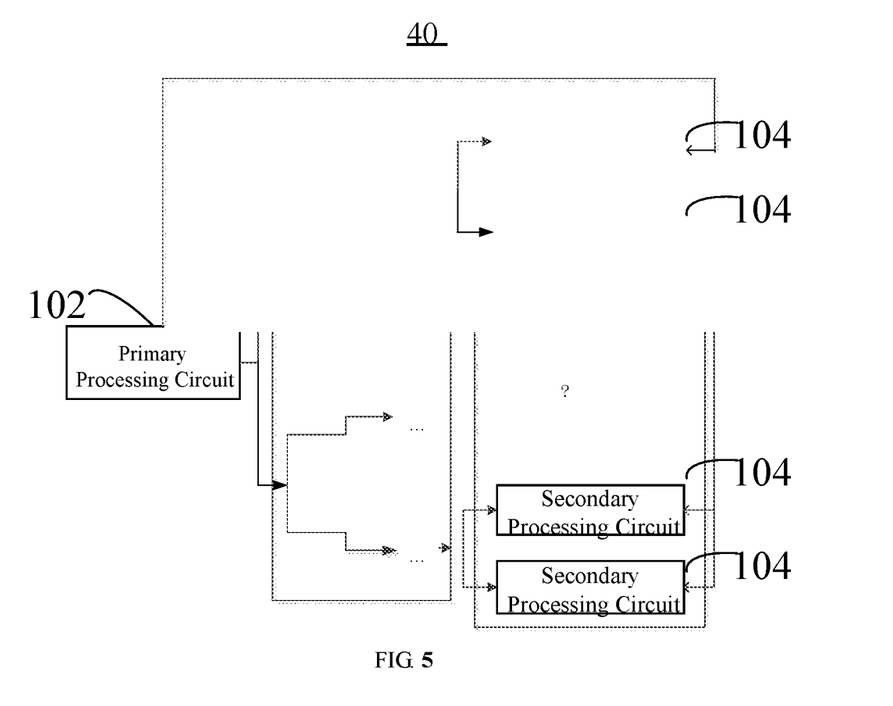
FIG. 5 is a structure diagram of a tree-structure module of the processor in one embodiment of the present disclosure.

Further and alternatively, as shown in FIG. 5, the processor 110 may include a tree-structure module 40. The tree-structure module 40 includes: a root port 401 and a plurality of branch ports 404. The root port of the tree-structure module 40 is connected to the primary processing circuit 102. The plurality of branch ports of the tree-structure module 40 are connected to one of the plurality of secondary processing circuits 104 respectively. The tree-structure module 40 has the functions of transmission and reception. For example, FIG. 5 shows the transmission function of the tree-structure module 40. The tree-structure module 40 may also have the function of reception. The tree-structure module 40 is configured to forward data blocks, weights and operation instructions between the primary processing circuit 102 and the plurality of secondary processing circuits 104.

Alternatively, the tree-structure module 40 is an optional result of a computing device. The tree-structure module 40 may include at least one layer of nodes. The nodes have a linear structure with the function of forwarding and may not have computation function. When the tree-structure module has zero layer of nodes, the tree-structure module is not needed.

Figure 6:
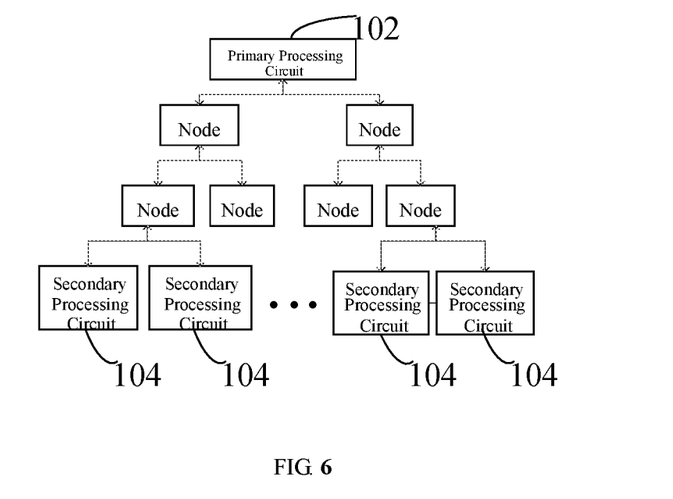
FIG. 6 is a binary tree structure diagram of a tree-structure module of the processor in one embodiment of the present disclosure.

Alternatively, the tree-structure module 40 may have an n-ary tree structure. For example, the tree-structure module 40 may have a binary tree structure as shown in FIG. 6, and may also have a ternary tree structure, the "n" can be an integer greater than or equal to 2. In the detailed description of the embodiments of the disclosure, the specific value of "n" is not limited, the number of the above-mentioned layer may also be 2, and the secondary processing circuits 104 may be connected to the nodes of a layer other than a second last layer, e.g., the nodes of the last layer as shown in FIG. 6.

Figure 7:
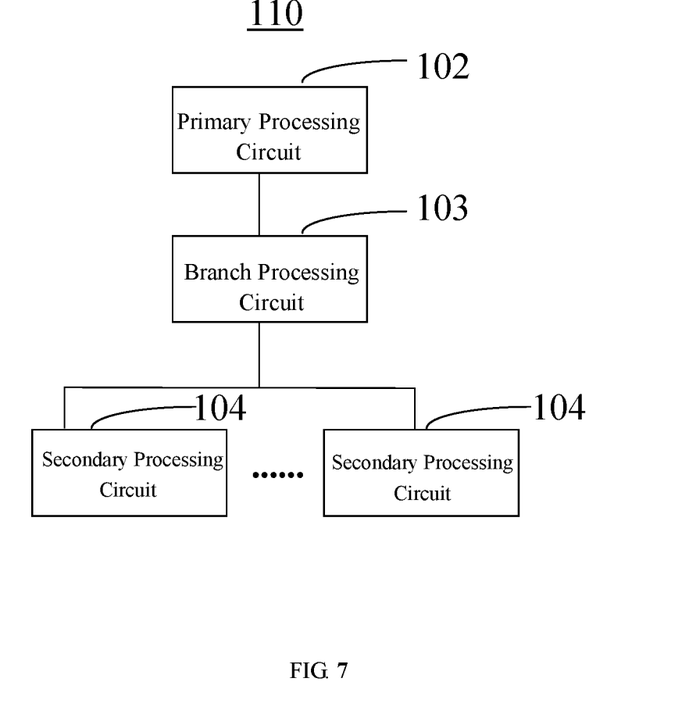
FIG. 7 is an internal structure diagram of the processor in one embodiment of the present disclosure.
Figure 8:
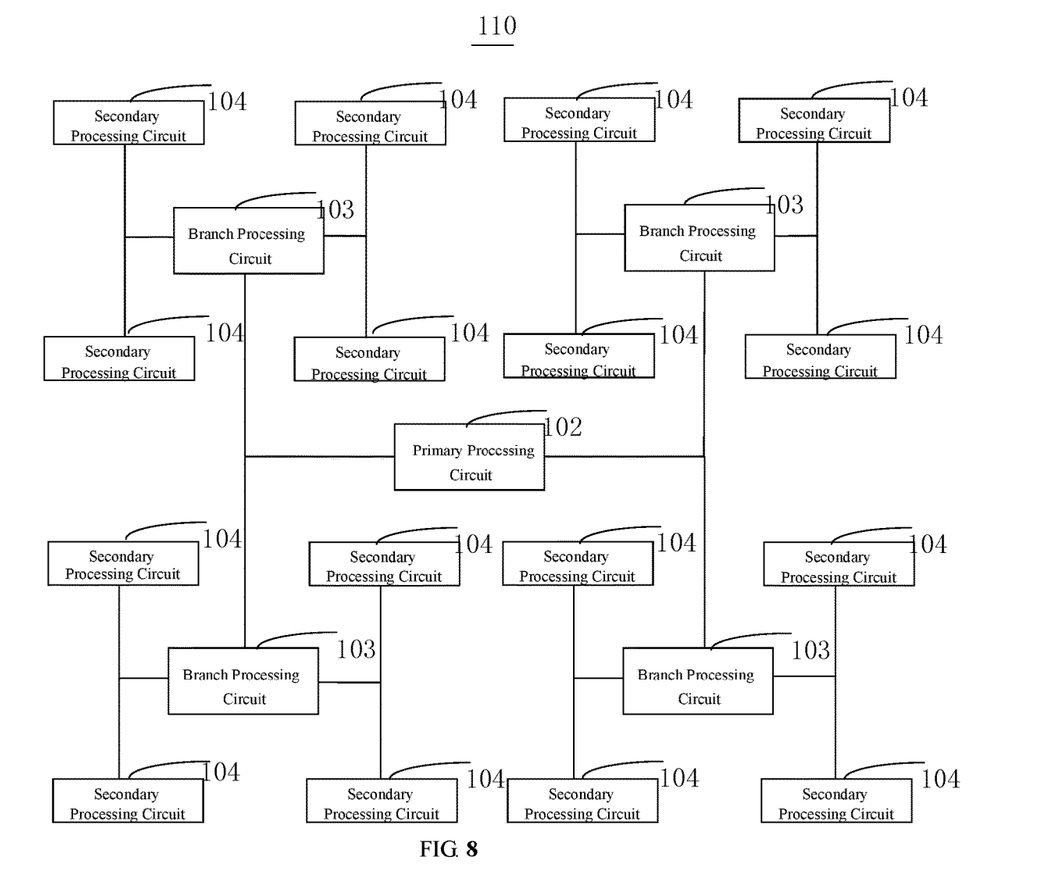
FIG. 8 is an internal structure diagram of the processor in one embodiment of the present disclosure.

In one alternative embodiment, the processor 110 may include one or more branch processing circuits 103. FIG. 7 or FIG. 8 shows the detailed electrical connection structure thereof.

The primary processing circuit 102 is electrically connected to the one or more branch processing circuits 103, and the one or more branch processing circuits 103 are electrically connected to the plurality of secondary processing circuits 104. In one embodiment, the primary processing circuit 102 is configured to divide one input data into a plurality of data blocks, the input data including: input neuron data and weight data. The primary processing circuit 102 is specifically configured to determine the input neuron data as broadcast data and the weight data as distribution data. The primary processing circuit 102 is further configured to divide one distribution data into a plurality of data blocks, and send at least one of the data blocks, the broadcast data, and at least one of a plurality of operation instructions to the one or more branch processing circuits 103.

The one or more branch processing circuits 103 are configured to forward data or instructions between the primary processing circuit 102 and the secondary processing circuits 104.

Figure 9:
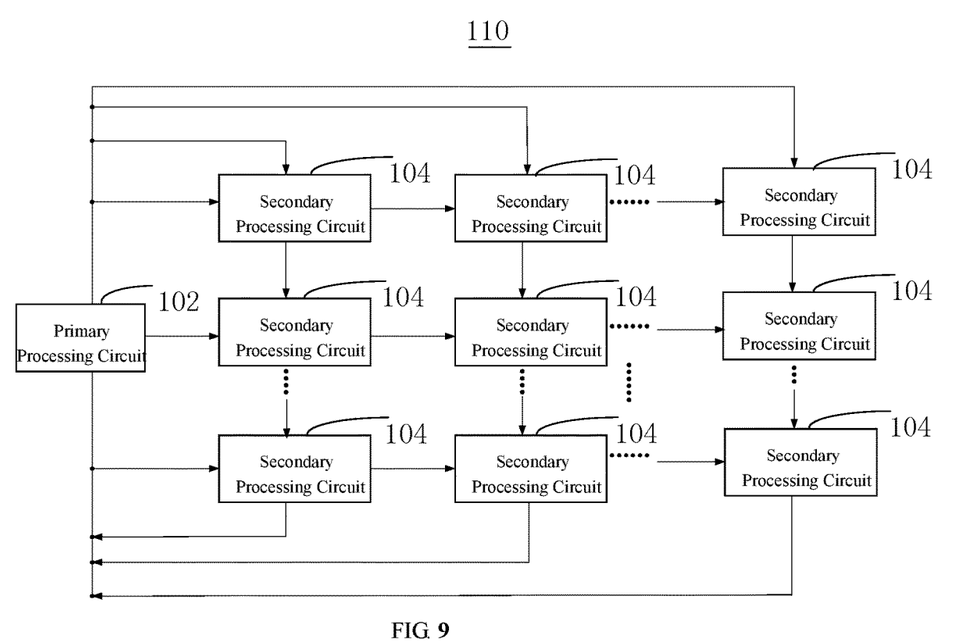
FIG. 9 is an internal structure diagram of the processor in one embodiment of the present disclosure.

In another alternative embodiment, as shown in FIG. 9, the processor 110 may include one primary processing circuit 102 and a plurality of secondary processing circuits 104. In one embodiment, the plurality of secondary processing circuits 104 are arranged in the form of an array. Each secondary processing circuit 104 is electrically connected to other adjacent secondary processing circuits, and the primary processing circuit 102 is electrically connected to k secondary processing circuits of the plurality of secondary processing circuits 104, the k secondary processing circuits being: n secondary processing circuits in a first line, n secondary processing circuits in a $m^{th}$ line, and m secondary processing circuits in a first column. The k secondary processing circuits are configured to forward data and instructions between the primary processing circuit 102 and the plurality of secondary processing circuits 104.

The specific structure of the above-mentioned processor 110 includes different architectures of the processor 110. It can be understood that the processor 110 may also have an architecture other than the above-mentioned schemes. The processor 110 is capable of performing various complex neural network operations.

The technical characteristics of the above-mentioned embodiments may be randomly combined. For the sake of brevity of description, not all possible combinations of the technical characteristics of the above-mentioned embodiments are described. However, as long as there is no contradiction in the combinations of these technical characteristics, all of the possible combinations should be considered as falling within the scope of the specification.

The above-mentioned embodiments merely describe several implementations of the disclosure. It should be understood that the description of the embodiments, while being relatively specific and detailed, are not given by way of limitation on the scope of the disclosure. Note that, those skilled in the art may make changes and modifications without departing from the disclosure in its broader aspects, which all fall within the scope of protection of the disclosure. Therefore, the scope of protection of the disclosure should be subject to the protection scope of the claims.

What is claimed is:

1. A data accelerated processing system, comprising:
   one or more processing devices electrically connected to an interface device,
   wherein each of the processing devices includes multiple processors,
   wherein the interface device includes a PCIE interface connected to one or more expansion modules,
   wherein the one or more expansion modules are respectively electrically connected to the multiple processors of the one or more processing devices such that the multiple processors are configured to process data parallelly to accelerate data processing;
   one or more storage devices respectively connected to the multiple processors, wherein each of the one or more storage devices includes one or more storage units configured to store data;
   a control device electrically connected to the one or more processing devices, wherein the control device is configured to retrieve parameters of the one or more processing devices and adjust respective status of the one or more processing devices based on the parameters;

a temperature monitoring device electrically connected to the control device, wherein the temperature monitoring device is configured to monitor respective temperatures of the one or more processing devices; and a reset device electrically connected to the one or more processing devices and configured to reset the one or more processing devices in response to one or more reset signals from the control device or the interface device.

2. The data accelerated processing system of claim 1, wherein the parameters of the one or more processing devices include respective temperatures of the one or more processing devices.

3. The data accelerated processing system of claim 1, wherein the parameters of the one or more processing devices include respective currents of the one or more processing devices.

4. The data accelerated processing system of claim 1, wherein the control device is further configured to reset the one or more processing devices.

5. The data accelerated processing system of claim 1, wherein the multiple processors are configured to process data of a total bit width of (N+M) bits, in which N represents a first bit width of data bits, M represents a second bit width of parity bits, N equals to $2^n$, and n is an integer greater than or equal to zero, M is a positive integer.

6. The data accelerated processing system of claim 5, wherein M equals to n+2, n is equal to or greater than 3, and M is equal to or greater than 5.

7. The data accelerated processing system of claim 1, wherein the one or more expansion modules are PCIE interface expansion chips.

8. The data accelerated processing system of claim 1, wherein the one or more storage units include one or more Double Data Rate Synchronous Dynamic Random Access Memories.

9. The data accelerated processing system of claim 1, further comprising a power supply device electrically connected to the one or more processing devices, the interface device, and the control device.

10. The data accelerated processing system of claim 9, further comprising a current monitoring device electrically connected to the power supply device and the control device, wherein the current monitoring device is configured to monitor the output of the power supply device to ensure the current for the normal functioning of the data accelerated processing system.

11. The data accelerated processing system of claim 1, further comprising a clock control device electrically connected to the one or more processing device and configured to control clocks of the one or more processing devices.

12. The data accelerated processing system of claim 1, wherein the multiple processors are configured to perform computations of a first pipeline stage on data to obtain a first result, the first result is input to a second pipeline stage to be executed in computations of the second pipeline stage to obtain a second result, and similarly, a n−1$^{th}$ result is input to a n$^{th}$ pipeline stage to be executed in computations of the n$^{th}$ pipeline stage, a n$^{th}$ result is obtained and input to the storage unit, wherein, n is an integer greater than or equal to 2.

13. The data accelerated processing system of claim 1, wherein each of the multiple processors includes a primary processing circuit and multiple secondary processing circuits, wherein the primary processing circuit is configured to execute operations on input data, and transmit data and operation instructions to the secondary processing circuits, wherein the secondary processing circuits are configured to execute intermediate operations in parallel based on data and operation instructions received from the primary processing circuit to obtain a plurality of intermediate results and transmit the plurality of intermediate results to the primary processing circuit, and wherein the primary processing circuit is further configured to execute data operations on the intermediate results to obtain an operation result of the operation instructions.

14. The data accelerated processing system of claim 13, wherein each of the multiple processors further includes a tree-structure module that includes:

a root port connected to the primary processing circuit, and multiple branch ports respectively connected to the secondary processing circuits, wherein the tree-structure module is configured to transmit data blocks, and operation instructions between the primary processing circuit and the secondary processing circuits.

15. The data accelerated processing system of claim 1, wherein each of the multiple processors includes a primary processing circuit, one or more branch processing circuits, and a plurality of secondary processing circuits, wherein the primary processing circuit is configured to divide input data into a plurality of data blocks, wherein the input data includes input neuron data and weight data, wherein the primary processing circuit is configured to determine the input neuron data as broadcast data, determine the weight data as distribution data, divide distribution data into the data blocks, send at least one of the data blocks, the broadcast data, and at least one of a plurality of operation instructions to the one or more branch processing circuits, wherein the one or more branch processing circuits are configured to forward the data blocks, the broadcast data, and the plurality of operation instructions between the primary processing circuit and the plurality of secondary processing circuits, wherein the secondary processing circuits are configured to process the received data blocks and the broadcast data according to the operation instructions to obtain intermediate results and to transmit the intermediate results to the one or more branch processing circuits, and wherein the primary processing circuit is configured to process the intermediate results to obtain the result of the operation instructions.

16. The data accelerated processing system of claim 1, wherein each of the multiple processors include a primary processing circuit and a plurality of secondary processing circuits, wherein the plurality of secondary processing circuits are arranged in a form of an array, wherein each of the secondary processing circuits is electrically connected to other adjacent secondary processing circuits, wherein the primary processing circuit is electrically connected to k secondary processing circuits of the plurality of secondary processing circuits, the k secondary processing circuits being: n secondary processing circuits in a first row, n secondary processing circuits in a $m^{th}$ row, and m secondary processing circuits in a first column, wherein each of the primary processing circuits is configured to divide input data into a plurality of data blocks and send at least one of the data blocks and at least one of a plurality of operation instructions to the k secondary processing circuits, wherein the k secondary processing circuits are configured to forward data and instructions between the primary processing circuit and other plurality of secondary processing circuits, wherein the plurality of secondary processing circuits are configured to execute operations on the received data blocks according to the operation instructions to obtain intermediate results, and transmit the operation results to the k secondary processing circuits, and wherein the primary processing circuit is configured to process the intermediate results sent from the k secondary processing circuits to obtain the result of the operation instructions.

* * * * *